United States Patent Office 3,773,766
Patented Nov. 20, 1973

3,773,766
CINNOLINYL(THIONO)PHOSPHORIC(PHOSPHONIC) ACID ESTERS AND ESTER AMIDES
Karl-Julius Schmidt, Wuppertal-Vohwinkel, Ingeborg Hammann, Cologne, and Günther Unterstenhöfer, Opladen, Germany, assignors to Bayer Aktiengesellschaft, Leverkusen, Germany
No Drawing. Filed Sept. 13, 1971, Ser. No. 180,148
Claims priority, application Germany, Sept. 18, 1970, P 20 46 088.2
Int. Cl. C07d 51/08
U.S. Cl. 260—250 A          7 Claims

ABSTRACT OF THE DISCLOSURE

Cinnolinyl(thiono)phosphoric(phosphonic) acid esters and ester amides of the general formula

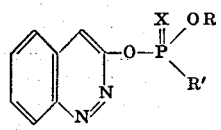

in which

X is oxygen or sulfur,
R is an alkyl radical with up to 6 carbon atoms, and
R' is an alkyl or alkoxy radical with up to 6 carbon atoms or a lower alkylamino radical, where each lower alkylamino radical has 1 to 4 carbon atoms, which possess insecticidal, acaricidal, fungicidal, and bactericidal properties.

---

The present invention relates to and has for its objects the provision of particular new cinnolinyl(thiono)phosphoric(phosphonic) acid esters and ester amides, i.e. O,O-dialkyl-O-cinnolin(3)-yl-phosphate, O-alkyl - O - cinnolin(3) - yl - alkane-phosphonate and O-alkyl - O - cinnolin(3)yl-phosphate alkylamide, or their thiono analogues, which possess insecticidal, acaricidal, fungicidal and bactericidal properties, active compositions in the form of mixtures of such compounds with solid and liquid dispersible carrier vehicles, and methods for producing such compounds and for using such compounds in a new way especially for combating pests, e.g. insects, acarids, fungi, and bacteria, especially insects and acarids, with other and further objects becoming apparent from a study of the within specification and accompanying examples.

It is known from published Dutch patent application 6810870 that benzotriazinylphosphoric acid ester derivatives such as O-ethyl-O-[benzo-1,2,4-triazin(3)yl]-ethanethionophosphonic acid ester (Compound A), O,O-diethyl-O-[benzo-1,2,4-triazin(3)yl]-phosphoric acid ester (Compound B) and O-ethyl-O-[benzo-1,2,4-triazin(3)yl]-methanethionophosphonic acid ester (Compound C), exhibit insecticidal and acaricidal activity.

The present invention provides, as new compounds, the cinnolinyl(thiono) - phosphoric(phosphonic) acid esters and ester amides of the general formula

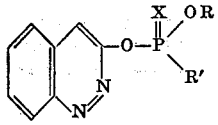

in which

X is oxygen or sulfur,
R is an alkyl radical with up to 6 carbon atoms, and
R' is an alkyl or alkoxy radical with up to 6 carbon atoms or a lower alkylamino radical.

These new compounds have been found to exhibit strong insecticidal and acaricidal properties, as well as, in a number of cases, fungicidal and bactericidal properties.

The present invention also provides a process for the preparation of a compound of the Formula I above, in which 3-hydroxycinnoline of the formula

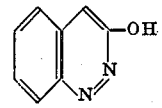

is reacted, either in the presence of an acid-binding agent or in the form of an alkali metal, alkaline earth metal or ammonium salt, with a phosphoric acid halide of the general formula

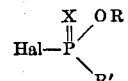

in which

X, R and R' have the meanings stated above, and
Hal denotes a halogen, preferably a chlorine, atom.

Surprisingly, the cinnolinyl(thiono)phosphoric(phosphonic) acid esters and ester amides of the present invention show a substantially better insecticidal and acaricidal activity than the known benzotriazinylphosphoric acid ester derivatives of analogous constitution and the same directions of activity, as well as showing, in a number of cases, fungicidal activity (especially against soil fungi) and bactericidal activity (particularly against *Xanthomonas oryzae*). The compounds of this invention therefore represent a genuine enrichment of the art.

If 3-hydroxycinnoline and O,O-diethylthionophosphoric acid chloride are used as starting materials, the reaction course can be represented by the following formula scheme:

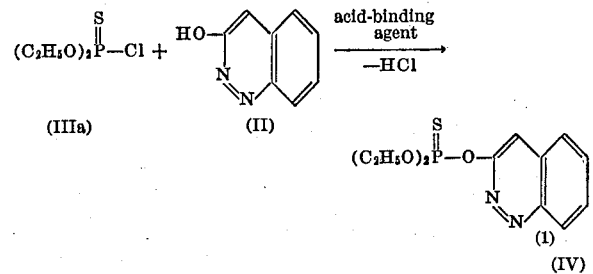

Preferably, R is a straight-chain or branched lower alkyl radical with 1-4 carbon atoms, namely methyl, ethyl, n- or isopropyl or n-, iso-, sec.- or tert.-butyl; R' denotes the same or a different straight-chain or branched alkyl radical with 1-4 carbon atoms, an alkoxy radical with 1-4 carbon atoms, namely methoxy, ethoxy, n- or isopropoxy or n-, iso-, sec.- or tert.-butoxy, or an alkylamino radical with 1-4, especially 1-3 carbon atoms in each alkyl group, namely methylamino, ethylamino or n- or iso-propylamino; and X is preferably sulfur.

As examples of the phosphoric acid derivatives which may be used as starting materials, there may be mentioned: O,O-dimethyl-, O,O-diethyl, O,O-dipropyl-, O,O-di-isopropyl-, O,O-dibutyl, O,O-di-tert.-butyl-, O,O-di-isobutyl-, O,O-di-sec.-butyl-, O-methyl-O-ethyl, O-methyl-O-isopropyl-, O-methyl-O-butyl-, O-ethyl-O-isopropyl-, and O-butyl-O-isopropyl-phosphoric acid chloride and their thiono analogues; O-methyl-methane-, O-methyl-ethane-, O - methyl-propane-, O - methyl-isopropane-, O-methyl-butane-, O-ethyl-methane-, O-ethyl-ethane-, O-ethyl-propane, O-isopropyl-propane-, O-isopropyl-methane and O-isopropyl-butane-phosphonic acid ester chlorides and their thiono analogues; and O-methyl-N-methyl-, O-methyl-N-ethyl-, O-methyl-N-propyl-, O-methyl-N-isopropyl-, O-ethyl-N-methyl-, O-ethyl-N-ethyl-, O-ethyl-N-propyl-, O-ethyl-N-isopropyl-, O-propyl - N - methyl-, O-propyl-N-ethyl-, O-propyl-N-propyl-, O-propyl-N-isopropyl-, O-iso-propyl-N-methyl-, O-iso-propyl-N-ethyl-, O-iso-propyl-N-iso-propyl-, O-butyl-N-ethyl- and O-butyl-N-isopropyl-phosphoric acid ester amide chlorides and their thiono analogues.

The phosphoric acid derivatives to be used as starting materials are known and can be prepared according to customary processes, as can 3-hydroxycinnoline (see E. S. Alford and K. Schofield, J. Chem. Soc. (London), 1952, p. 2102).

The process is preferably carried out with the use of suitable solvents or diluents. As such, practically all inert organic solvents are suitable, especially aliphatic and aromatic optionally chlorinated hydrocarbons, such as benzene, toluene, xylene, benzine, methylene chloride, chloroform, carbon tetrachloride and chlorobenzene; ethers, such as diethyl ether, dibutyl ether and dioxane; ketones, for example acetone, and methylethyl, methylisopropyl and methylisobutyl ketones; nitriles, such as acetonitrile and propionitrile; and alcohols, such as ethanol and propanol.

As acid-binding agents, all customary acid-acceptors can be used. Particularly good results have been obtained with alkali metal carbonates and alcoholates, such as sodium and potassium carbonates, methylates and ethylates, as well as with aliphatic, aromatic and heterocyclic amines, for example triethylamine, dimethylamine, dimethylaniline, dimethylbenzylamine and pyridine.

The reaction temperature can be varied within a fairly wide range. In general, the reaction is effected at from about 0° to 120° C., preferably at about 60° to 80° C.

When carrying out the process, the starting materials are, in most cases, used in equimolar amounts. An excess of one or other of the reactants brings no substantial advantages. The reaction is preferably carried out in the presence of one of the above-mentioned solvents and of an acid-acceptor, within the above-stated temperature range. After several hours' stirring—possibly with heating—the reaction mixture may be worked up in a customary manner.

The compounds are obtained, in most cases, in a crystalline form and, in these cases, may be characterized by their melting points.

As already mentioned, the compounds of the present invention are distinguished by an outstanding insecticidal and acaricidal effectiveness, especially against plant pests and pests of stored products. They possess a good activity against both sucking and biting insects, as well as against mites (Acarina), while exhibiting only a low phytotoxicity. In some cases they also exhibit fungicidal and bactericidal properties. Accordingly, the compounds of the present invention may be used with success as pesticides in crop protection and the protection of stored goods.

To the sucking insects contemplated herein there belong, in the main, aphids (Aphidae) such as the green peach aphid (*Myzus persicae*), the bean aphid (*Doralis fabae*), the bird cherry aphid (*Rhopalosiphum padi*), the pea aphid (*Macrosiphum pisi*) and the potato aphid (*Macrosiphum solanifolii*), the currant gall aphid (*Cryptomyzus korschelti*), the rosy apple aphid (*Sappaphis mali*), the mealy plum aphid (*Hyalopterus arundinis*) and the cherry black-fly (*Myzus cerasi*); in addition, scales and mealybugs (Coccina), for example the oleander scale (*Aspidiotus hederae*) and the soft scale (*Lecanium hesperidum*) as well as the grape mealybug (*Pseudococcus maritimus*); thrips (Thysanoptera), such as *Hercinothrips femoralis*, and bugs, for example the beet bug (*Piesma quadrata*), the red cotton bug (*Dysdercus intermedius*), the beg bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus*; and the like.

In the case of the biting insects, contemplated herein above all there should be mentioned butterfly caterpillars (Lepidoptera) such as the diamond-back moth (*Plutella maculipennis*), the gypsy moth (*Lymantria dispar*), the brown-tail moth (*Euproctis chrysorrhoea*) and tent caterpillar (*Malacosoma neustria*); further, the cabbage moth *Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia kühniella*) and greater wax moth (*Galleria mellonella*); and the like.

Also to be classed with the biting insects contemplated herein are beetles (Coleoptera), for example the granary weevil (*Sitophilus granarius=Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (*Bruchidius=Acanthoscelides obtectus*), the leather beetle (*Dermestes frischi*), the khapra beetle (*Trogoderma granarium*), the flour beetle (*Tribolium castaneum*), the northern corn billbug (*Calandra or Sitophilus zeamais*), the drugstore beetle (*Stegobium paniceum*), the yellow mealworm (*Tenebrio molitor*) and the saw-toothed grain beetle (*Oryzaephilus surinamensis*), and also species living in the soil, for example wireworms (Agriotes spec.) and larvae of the cockchafer (*Melolontha melolontha*); cockroaches, such as the German cockroach (*Blattella germanica*), American cockroach (*Periplaneta americana*), madeira cockroach (*Leucophaea or Rhyparobia maderae*), oriental cockroach (*Blatta orientalis*), the giant cockroach (*Blaberus giganteus*) and the black giant cockroach (*Blaberus fuscus*) as well as *Henschoutedenia flexivitta*; further, Orthoptera, for example the house cricket (*Acheta domesticus*); termites such as the eastern subterranean termite (*Reticulitermes flavipes*) and hymenoptera such as ants, for example the garden ant (*Lasius niger*); and the like.

The Diptera comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia regina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*); and the like.

With the mites (Acarina) contemplated herein there are classed, in particular, the spider mites (Tetranychidae) such as the two-spotted spider mite (*Tetranychus telarius=Tetranychus althaeae* or *Tetranychus urticae*) and the European red mite (*Paratetranychus pilosus=Panonychus ulmi*), gall mites, for example the black currant gall mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*); and the like.

When applied against pests harmful to health and pests of stored products, particularly flies and mosquitoes, the compounds of this invention are also distinguished by an outstanding residual activity on wood and clay, as well as a good stability to alkali on limed substrates.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as Freon; inert dispersible liquid diluent carriers, including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.), and/or water; as well as inert dispersible finely divided solid carriers, such as ground natural minerals (e.g. kaolins, clays, alumina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waster liquors, methyl cellulose, etc.

Such active compounds may be employed alone or in the form of mixtures with one another and/or with such solid and/or liquid dispersible carrier vehicles and/or with other known compatible active agents, especially plant protection agents, such as other acaricides, insecticides, fungicides and bactericides, or nematocides, rodenticides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–10%, preferably 0.01–1%, by weight of the mixture. Thus, the present invention contemplates overall compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95%, and preferably 0.01–95%, by weight of the mixture.

The active compounds can also be used in accordance with the well-known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g./hectare, preferably 40 to 600 g./hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively killing, combating or controlling pests, e.g. insects, acarids, fungi and plant bacteria and more particularly methods of combating at least one of insects and acarids which comprises applying to at least one of correspondingly (a) such insects, (b) such acarids, (c) such fungi, (d) such plant bacteria, and (e) the corresponding habitat thereof, i.e. the locus to be protected, a correspondingly combative or toxic amount, i.e. an insecticidally, acaricidally, fungicidally or bactericidally effective amount of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention are illustrated by the following examples:

EXAMPLE 1

Phaedon larvae test

Solvent: 3 parts by weight acetone
Emulsifier: 1 part by weight alkylaryl polyglycol ether.

To produce a suitable preparation of active compound, 1 part by weight of the active compound is mixed with the stated amount of solvent containing the stated amount of emulsifier, and the concentrate is diluted with water to the desired concentration.

Cabbage leaves (*Brassica oleracea*) are sprayed with the preparation of the active compound until dripping wet and then infested with mustard beetle larvae (*Phaedon cochleariae*).

After the specified periods of time, the degree of destruction is determined as a percentage: 100% means that all the beetle larvae are killed. 0% means that none of the beetle larvae are killed.

Active compounds, the concentration of the active compounds, the times of evaluation and the results can be seen from the following Table 1:

TABLE 1
(Phaedon larvae test)

| Active compound | | Concentration of active compound in percent | Degree of destruction in percent after 3 days |
|---|---|---|---|
| 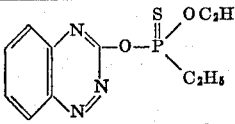 (known) | (A) | 0.1<br>0.01<br>0.001 | 100<br>100<br>0 |
| 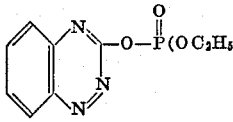 (known) | (B) | 0.1<br>0.01<br>0.001 | 100<br>100<br>0 |
| 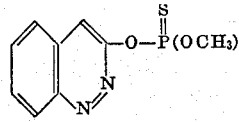 | (2) | 0.1<br>0.01<br>0.001 | 100<br>100<br>100 |
| 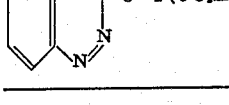 | (1) | 0.1<br>0.01<br>0.001 | 100<br>100<br>100 |
| 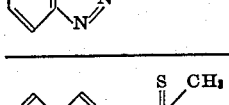 | (3) | 0.1<br>0.01<br>0.001<br>0.0001 | 100<br>100<br>85<br>80 |
| 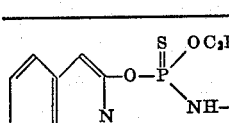 | (4) | 0.1<br>0.01<br>0.001 | 100<br>100<br>100 |
| 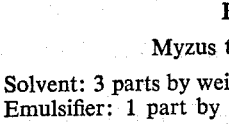 | (5) | 0.1<br>0.01<br>0.001 | 100<br>100<br>95 |

EXAMPLE 2

Myzus test (contact action)

Solvent: 3 parts by weight acetone
Emulsifier: 1 part by weight alkylarylpolyglycol ether.

To produce a suitable preparation of active compound, 1 part by weight of the active compound is mixed with the stated amount of solvent containing the stated amount of emulsifier and the concentrate is diluted with water to the desired concentration.

Cabbage plants (*Brassica oleracea*) which have been heavily infested with peach aphids (*Myzus persicae*) are sprayed with the preparation of the active compound until dripping wet.

After the specified periods of time, the degree of destruction is determined as a percentage: 100% means that all the aphids are killed whereas 0% means that none of the aphids are killed.

The active compounds, the concentrations of the active compounds, the evaluation times and the results can be seen from the following Table 2:

TABLE 2
(Myzus test)

| Active compound | | Concentration of active compound in percent | Degree of destruction in percent after 1 day |
|---|---|---|---|
| 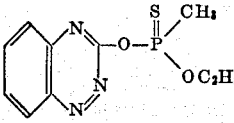 (known) | (C) | 0.1<br>0.01<br>0.001 | 100<br>100<br>0 |
| 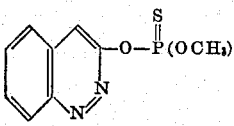 | (2) | 0.1<br>0.01<br>0.001 | 100<br>1000<br>95 |
| 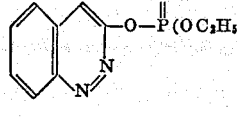 | (1) | 0.1<br>0.01<br>0.001 | 100<br>100<br>99 |
| 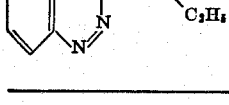 | (3) | 0.1<br>0.01<br>0.001 | 100<br>100<br>100 |
| 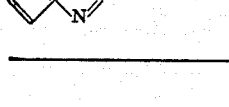 | (4) | 0.1<br>0.01<br>0.001 | 100<br>100<br>100 |

EXAMPLE 3

Tetranychus test

Solvent: 3 parts by weight acetone
Emulsifier: 1 part by weight alkylarylpolyglycol ether.

To produce a suitable preparation of active compound, 1 part by weight of the active compound is mixed with the stated amount of solvent containing the stated amount of emulsifier and the concentrate so obtained is diluted with water to the desired concentration.

Bean plants (*Phaseolus vulgaris*), which have a height of approximately 10–30 cm., are sprayed with the preparation of the active compound until dripping wet. These bean plants area heavily infested with spider mites (*Tetranychus urticae*) in all stages of development.

After the specified periods of time, the effectiveness of the preparation of active compound is determined by counting the dead mites. The degree of destruction thus obtained is expressed as a percentage: 100% means that all the spider mites are killed whereas 0% means that none of the spider mites are killed.

The active compounds, the concentrations of the active compounds, the evaluation times and the results can be seen from the following Table 3:

TABLE 3

(Tetranychus test)

| Active compound | | Concentration of active compound in percent | Degree of destruction in percent after 1 day |
|---|---|---|---|
| 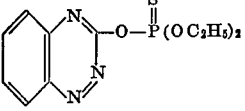 (known) | (D) | 0.1 | 20 |
| 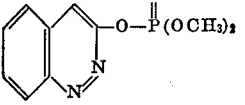 | (2) | 0.1<br>0.01 | 100<br>70 |
| 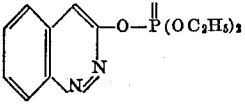 | (1) | 0.1<br>0.01 | 100<br>100 |
| 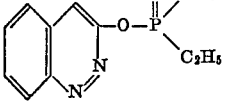 | (3) | 0.1<br>0.01 | 100<br>100 |
| 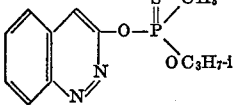 | (4) | 0.1<br>0.01<br>0.001 | 100<br>100<br>50 |

EXAMPLE 4

Myzus test/resistant (contact action)

Solvent: 3 parts by weight acetone
Emulsifier: 1 part by weight alkylarylpolyglycol ether.

To produce a suitable preparation of active compound, 1 part by weight of the active compound is mixed with the stated amount of solvent containing the stated amount of emulsifier and the concentrate is diluted with water to the desired concentration.

Cabbage plants (Brassica oleracea) which have been heavily infested with peach aphids (Myzus persicae) are sprayed with the preparation of the active compound until dripping wet.

After the specified periods of time, the degree of destruction is determined as a percentage: 100% means that all the apids are killed whereas 0% means that none of the aphids are killed.

The active compounds, the concentrations of the active compounds, the evaluation times and the results can be seen from the following Table 4:

TABLE 4

(Myzus persicae test/resistant)

| Active compound | | Concentration of active compound in percent | Degree of destruction in percent after 1 day |
|---|---|---|---|
| 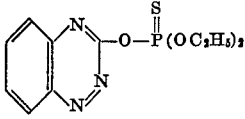 (known) | (D) | 0.1<br>0.02 | 45<br>35 |
| 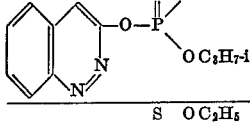 | (4) | 0.1<br>0.02<br>0.004 | 100<br>100<br>50 |
| 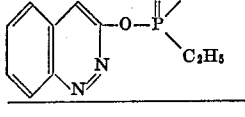 | (3) | 0.1<br>0.02<br>0.004<br>0.0008 | 100<br>100<br>98<br>50 |

EXAMPLE 5

Phorodon test/resistant (contact action)

Solvent: 3 parts by weight acetone
Emulsifier: 1 part by weight alkylarylpolyglycol ether.

To produce a suitable preparation of active compound, 1 part by weight of the active compound is mixed with the stated amount of solvent containing the stated amount of emulsifier, and the concentrate is diluted with water to the desired concentration.

Hop plants (Humulus lupulus) which have been heavily infested with the hop aphid (Phorodon humuli) are sprayed with the preparation of the active compound until dripping wet.

After the specified periods of time, the degree of destruction is determined as a percentage: 100% means that all the aphids were killed; 0% means that none of the aphids were killed.

The active compounds, the concentrations of the active compounds, the evaluation times and the results can be seen from the following Table 5:

TABLE 5

(Phorodon humuli test/resistant)

| Active compound | | Concentration of active compound in percent | Degree of destruction in percent after 1 day |
|---|---|---|---|
| 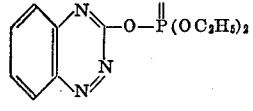 (known) | (D) | 0.1<br>0.02<br>0.004 | 60<br>45<br>30 |
| 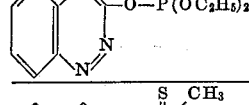 | (1) | 0.1<br>0.02<br>0.004<br>0.0008 | 100<br>100<br>95<br>80 |
| 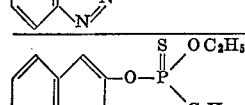 | (4) | 0.1<br>0.02<br>0.004<br>0.0008<br>0.00016 | 100<br>100<br>100<br>85<br>65 |
| 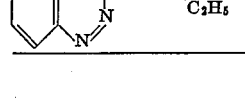 | (3) | 0.1<br>0.02<br>0.004<br>0.0008<br>0.00016 | 100<br>100<br>100<br>95<br>90 |

The process of the invention is illustrated in and by the following preparative example.

EXAMPLE 6

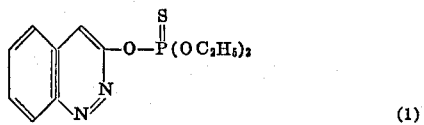

36.5 g. (0.25 mole) of 3-hydroxycinnoline and 42 g. of dry, finely powdered potassium carbonate are heated in 300 ml. of acetonitrile to 80° C. for 30 minutes. The temperature is permitted to drop to 70° C. and 47 g. of diethylthiophosphoric acid chloride are then added dropwise to the mixture over one hour. The mixture is stirred cold overnight and is then heated for a short time to 50° C. After cooling, the reaction mixture is taken up in 400 ml. of benzene and freed from the soluble constituents by washing with water, 1 N NaOH and again with water. The benzene solution is dried over sodium sulfate and concentrated. The residue is recrystallized from alcohol. The O,O-diethyl-O-cinnolin(3)yl-thionophosphoric acid ester has a melting point of 43° C. The yield is 35 g. (47% of theory).

Analysis.—Calculated for $C_{12}H_{15}N_2O_3PS$ (molecular weight 298.3) (percent): N, 9.39; P, 10.38; S, 10.75. Found (percent): N ,9.10; P, 10.30; S, 10.90.

In analogous manner, the following compounds are synthesized:

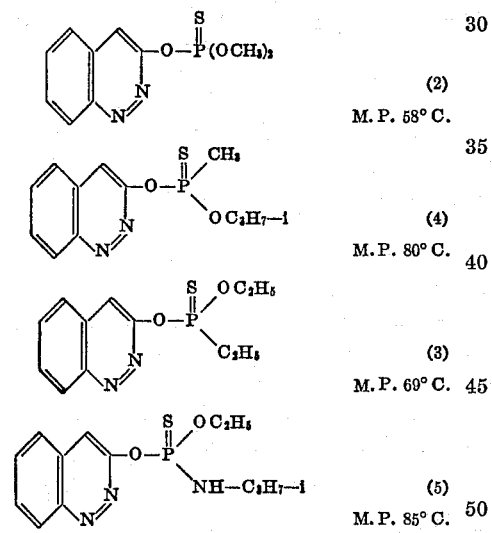

Other compounds in accordance with the invention which can be produced in analogous manner are the di-lower alkylamino analogues of the foregoing as well as those analogues where the sulfur atom is replaced by oxygen. The amides are produced by starting with the (thiono)phosphoric acid amide-chloride and reacting it with the hydroxy-cinnoline.

It will be appreciated that the instant specification and examples are set forth by way of illustration and not limitation and that various modifications and changes may be made without departing from the spirit and scope of the present invention.

What is claimed is:
1. A cinnolinyl(thiono)phosphoric(phosphonic) acid ester of the formula

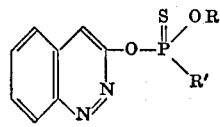

in which

R is an alkyl radical with up to 6 carbon atoms, and
R' is an alkyl or alkoxy radical with up to 6 carbon atoms or a lower alkylamino radical, where each lower alkylamino radical has 1 to 4 carbon atoms.

2. A compound according to claim 1, in which R is an alkyl radical with up to 4 carbon atoms; R' is an alkyl or alkoxy radical with up to 4 carbon atoms or a monoalkylamino radical with up to 3 carbon atoms.

3. A compound according to claim 1 wherein such compound is O,O-dimethyl-O-cinnolin(3)yl-thionophosphate of the formula

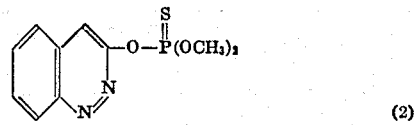

4. A compound according to claim 1 wherein such compound is O,O-diethyl-O-cinnolin(3)yl-thionophosphate of the formula

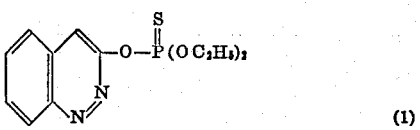

5. A compound according to claim 1 wherein such compound is O-ethyl-O-cinnolin(3)yl-ethanethionophosphonate of the formula

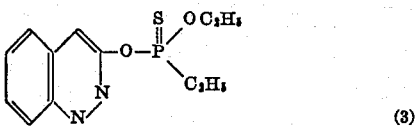

6. A compound according to claim 1 wherein such compound is O-isopropyl-O-cinnolin(3)yl-methanethionophosphonate of the formula

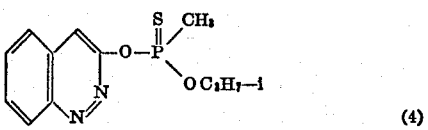

7. A compound according to claim 1 wherein such compound is O-ethyl-O-cinnolin(3)yl-thionophosphoric acid ester N-isopropylamide of the formula

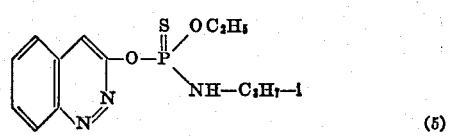

References Cited

FOREIGN PATENTS 19,294    9/1963    Japan _____ 250—260 A
297,307   6/1954    Switzerland.

OTHER REFERENCES

Arbuzov, V. et al.: "Synthesis of Esters of Phosphinic Acids Containing Heterocyclic Radicals," Ivest. Akad. Nauk. S.S.S.R., 1016–21 (1961), C.A., 55:27353b.

R. McCLOUD, Assistant Examiner

U.S. Cl. X.R.

424—250